INVENTORS
ROBERT O. STRAUGHN
ROBERT N. BATESON
ROBERT W. STEPHENSON
BY Harold O. Jastram
ATTORNEY

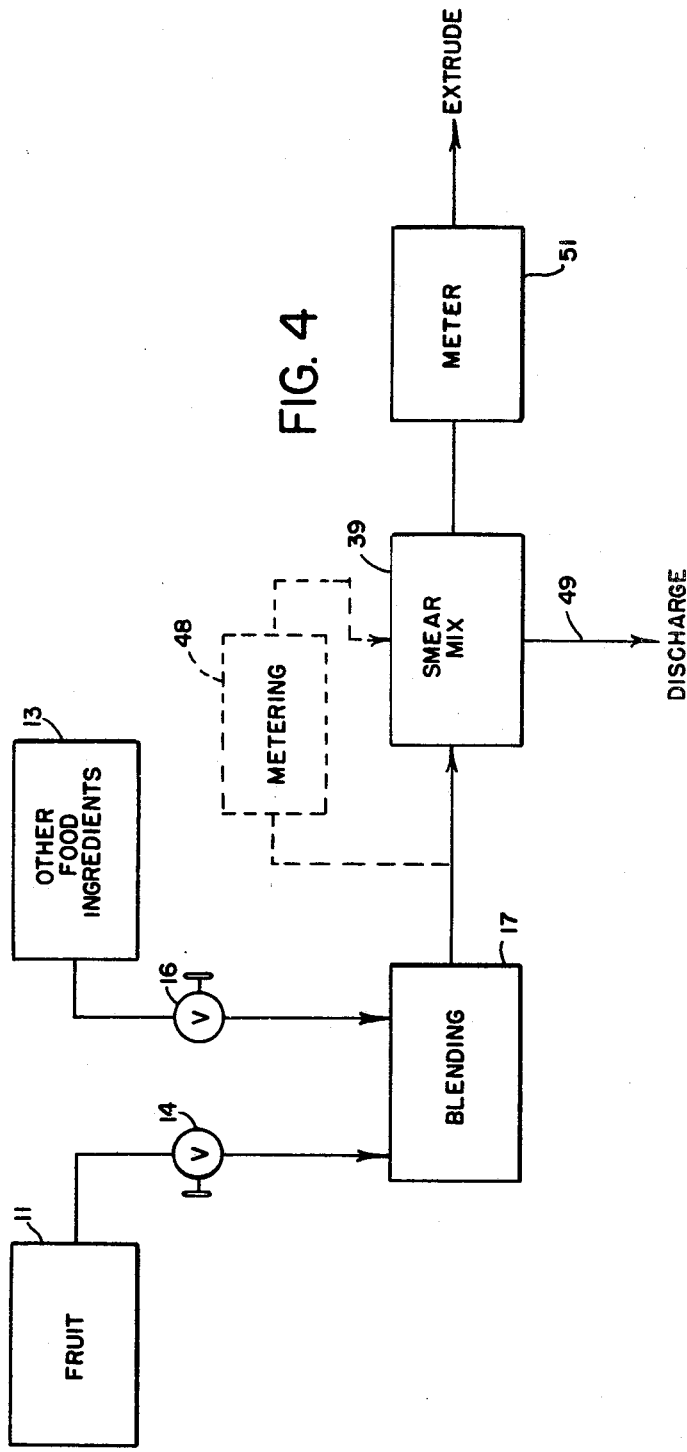

United States Patent Office 3,505,085
Patented Apr. 7, 1970

3,505,085
APPARATUS FOR PROCESSING
FOOD PRODUCTS
Robert O. Straughn, Robert N. Bateson, and Robert W. Stephenson, Minneapolis, Minn., assignors to General Mills, Inc., a corporation of Delaware
Original application Nov. 27, 1964, Ser. No. 414,133. Divided and this application June 17, 1968, Ser. No. 737,794
Int. Cl. A47j 43/04
U.S. Cl. 99—234    4 Claims

ABSTRACT OF THE DISCLOSURE

Apparatus for processing food products such as corn, soybean, cereal grain and other vegetable proteins to upgrade the proteins and simulate the physical and taste characteristics of other foods. The apparatus is a mixing apparatus utilizing a rotating core having helical agitators all mounted in a barrel through which food products are fed to produce intensive mixing of the various food ingredients to produce a generally homogeneous food mixture.

---

Figure 1:
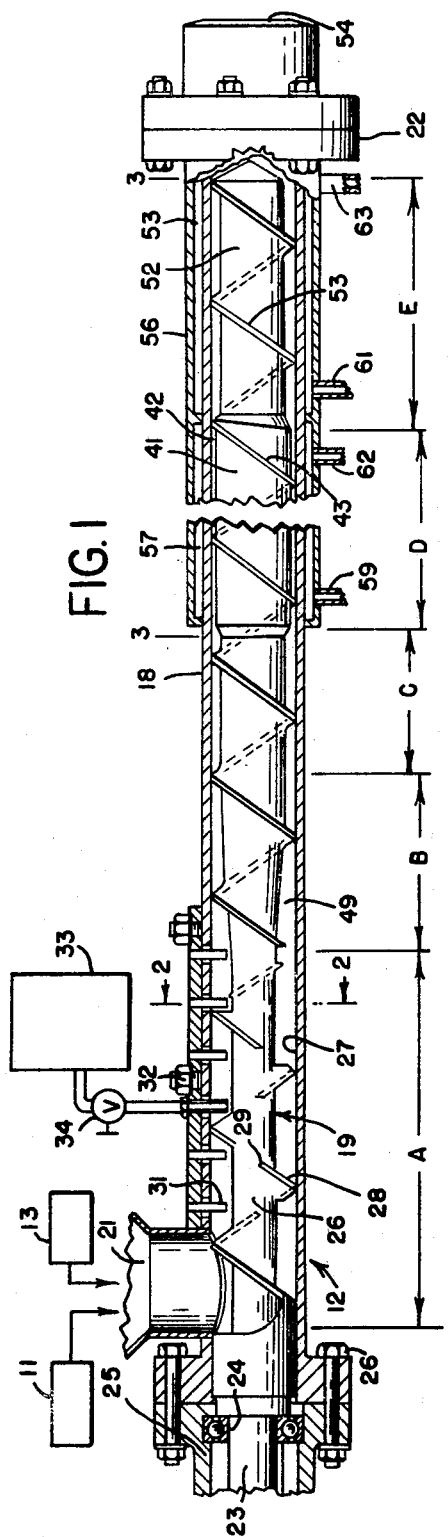

This application is a division of our co-pending application Ser. No. 414,133, filed Nov. 27, 1964.

The present invention relates to an apparatus for mixing food ingredients and more particularly to an apparatus for continuously producing a homogeneous food mixture from separate streams of food ingredients.

Many present day convenience food products and processed foods are the result of extensive modification of natural food products such as cereal grains, fruits, vegetables, meats, corn and the like. A number of the modifications concern the combination of one or more natural food products to form a new convenience food product having novel and unusual taste and physical characteristics not normally associated with the unprocessed natural foods. Frequently, the individual characteristics of these natural food products or the modifications desired in the end product present problems when an attempt is made to combine these diverse types of natural food products to form a new product of uniform quality, taste, and physical characteristics.

An example of such a processed food is illustrated by the many ready-to-eat cereals in which the basic ingredient may be one or several of the cereal grains such as rice, wheat, oats, and the like. One of the first steps in the production of one type of such ready-to-eat cereals is the reduction of the cereal grain to a flour. This flour is then mixed with a number of other ingredients such as flavorings, preservatives and similar ingredients to form a mixture which is ultimately processed to form the finished breakfast cereal product. As might be expected, one of the serious problems in producing a satisfactory ready-to-eat cereal product involves mixing the various ingredients with the basic flour material in order to produce a mixture which has a homogeneous consistency. Thorough mixing to produce a truly homogeneous mixture is often difficult if not impossible to achieve due to the difference in the nature of the ingredients involved. For instance, the cereal grain flour in its basic dry powdered form may be difficult to mix with other ingredients which are liquid or semi-liquid in form. Such a difference in materials often results in the formation of a heterogeneous mixture where the flour is not thoroughly intermixed with the liquid or semi-liquid material. The resulting heterogeneous mixture will not result in a product of uniform characteristics due to the isolated concentrations of one or more of the ingredients which go to make up the processed food product.

Since processed foods containing a number of different food ingredients are very difficult to mix, intense agitation is necessary to achieve a thorough and satisfactory homogeneous mixture of the ingredients. If this homogeneous mixture is not obtained, further processing of the materials (e.g. cooking, pelletizing) will not result in a satisfactory end product. In the past the intense mixing has been accomplished through batch mixing of the ingredients. In batch mixing, the various food ingredients are subjected to intense mixing by combining all of the food ingredients and then subjecting the entire heterogeneous mixture to intense agitation until a mixture of satisfactory characteristics is achieved. This batch mixing of material is then further processed or cooked. In the case of a ready-to-eat cereal, batch mixed ingredients are cooked, the dough mass formed into pellets and the pellets further processed into flakes or other shapes. Batch by batch preparation of a homogeneous material is time consuming, costly, and tends to vary the quality of the finished product. This change in quality occurs because the first material taken from a batch of mixed material is realtively fresh whereas the last material used from the batch will have changed some of its characteristics either through evaporation of the liquid, oxidation of certain of the ingredients and the like. Accordingly, it would be desirable to provide a method and apparatus which is capable of intensively mixing heterogeneous mixtures in order to produce a homogeneous mixture on a continuous basis so that the resulting mixture is utilized on a continuous basis. This continuous utilization of the homogeneous mixture will result in a product of uniform characteristics and quality.

Another example of processed foods requiring proper mixing techniques is in the preparation of fruits and vegetables where the fruits and vegetables are reduced to a paste or a slurry which is then combined with flavoring agents, sweetening agents, coloring agents and similar ingredients. A paste is a highly viscous material which may or may not contain suspended or entrained solids, or other dissolved ingredients. A slurry is usually much less viscous than a paste, having suspended solids in varying concentrations. Both types of materials can be used equally well in this invention and the word slurry will be used generically to include both types of materials. The quality of the end product is highly dependent upon the effectiveness of the mixing techniques wherein the additives are combined with the slurry of the fruit or vegetable being used. For example, some fruits are used to prepare products which are very low in moisture and which are intended for merchandising in unrefrigerated packages. Such finished products require precise control of the mixing of the fruit slurry with the added ingredients such as flavoring agents and preservatives in order to achieve h:gh product quality. The mixing of the fruit slurry and added ingredients can be accomplished by batch techniques. However, this requires a great deal of apparatus and results in products of varying quality from batch to batch.

It is therefore an object of the present invention to provide a new and improved apparatus for the preparation of food products.

A further object of the present invention is to provide a new and improved apparatus for continuously mixing food ingredients.

A further object of the present invention is to provide a new and improved apparatus for continuously mixing food ingredients to convert a heterogeneous mixture of ingredients to a homogeneous mixture of food ingredients.

It is a further object of the present invention to provide a new and improved apparatus for the production of a homogeneous mixture of food ingredients by subjecting the ingredients to intensive mixing by continuous and simultaneous pressing, mixing, stretching, shearing and twisting of the heterogeneous mixture of the food ingredients.

A further object of the present invention is to provide a new and improved apparatus for continuously mixing food ingredients with a controlled degree of homogeneity.

Figure 3:
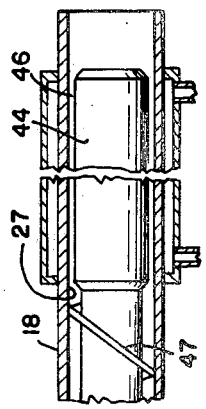
Figure 2:
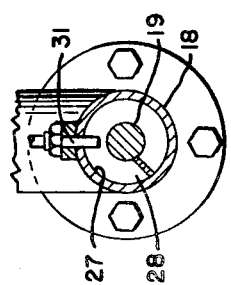

The above and further objects of the present invention will become apparent from a reading of the following description taken in conjunction with the accompanying drawings wherein:

FIG. 1 is a cross sectional view of an apparatus for accomplishing mixing of food ingredients, FIG. 2 is a cross section taken along lines 2—2 of FIG. 1 showing a cross section of the apparatus, FIG. 3 is a fractional and partial cross section view taken between lines 3—3 of FIG. 1 and showing an alternate embodiment of a portion of FIG. 1, and FIG. 4 is a schematic block diagram of a process for forming homogeneous mixtures of food ingredients.

For the purpose of further illustrating the invention an example of mixing a fruit formulation will be set forth. In the case of certain fruit formulations, there are at least three types of feed materials: prepared fruit; dry, granular material; and liquids. Under certain circumstances, certain of the streams may be combined. For example, a flour and sugar might be combined rather than using two separate feeders. Those skilled in the art of handling bulk quantities of food ingredients will understant that circumstances such as quality and preservation of the product will dictate that certain streams can be combined while others should be supplied separately.

An example of a prepared fruit might be stemless-seedless raisins. The raisins may have a moisture range of about 5 to about 16% by weight. The dry ingredients might consist of sugar and starch. Further, coloring agents, flavoring agents, and preservatives might also be required. These various ingredients at their storage point in the process are illustrated in FIG. 4 of the drawings by block 11 (fruit) and block 13 (other ingredients). While only a single block 13 is utilized to illustrate the storage of these food ingredients, in actual practice, each of the food ingredients may be held in a separate container. Separate storage of the individual ingredients and fruit help promote continued high quality of the individual ingredients for extended periods. Often food ingredients which are mixed will tend to deteriorate if the mixture is not used immediately. This is especially true if mixtures containing water and/or other liquids are mixed with certain dry materials.

The ingredients are combined by directing the individual streams directly into a blender (see block 17 in FIG. 4). The individual ingredients are continuously combined to produce a heterogeneous mixture of ingredients. The quantity of the individual ingredients which go to make up the heterogeneous mixture may be controlled by valves or other flow controlling means. Valves 14 and 16 of FIG. 4 illustrate a means for accomplishing this control of the flow of the food ingredients. Thus the proper quantities of the individual ingredients are used to form the final heterogeneous mixture through control of such valves 14 and 16. Further, it is noted, that with such control, the ingredient control can take place on a continuous basis so that there is no need for batch mixing of the various ingredients. Further, the ingredients are not premixed and then introduced into the blender but the heterogeneous mixture is first formed in the blender. This procedure prevents lumping of the material, reduces physical handling of the material and reduces undesirable heterogeneity as a result of liquid penetration of the solids.

After the heterogeneous mixture is formed, the material is blended. This blending is illustrated by block 17 of the flow diagram in FIG. 4. The blending may be accomplished in commercially available blenders, a common type of which contains simple paddles for intermixing the ingredients. Preferably, however, a mixing apparatus such as that illustrated in FIG. 1 of the drawings is used to blend the food ingredients. The mixing apparatus generally designated by the numeral 12 has a barrel 18. A mixer 19 is positioned within the barrel 18 and extends from the input end 21 of the barrel to the output or discharge end 22 of the barrel. The mixer 19 is divided into sections A, B, C, D and E, each of which is designed to accomplish a specific mixing function. The geometric configuration of the opening at input end 21 should be capable of accommodating several streams of ingredients which are introduced into blending section A and to obtain adequate capacity. The input capacity must be great enough to assure a constant rate of material movement into the input 21. It has been determined that a preferred shape for the input end 21 is an elongated or rectangular opening having a width to length ratio of about 2 to 1 with the width being equal to the inside diameter of the barrel 18. It has been found, for example, that a width to length ratio of unity is inadequate for the opening in the input end 21.

The mixer 19 is connected to a drive shaft 23 by conventional means. The drive shaft 23 is mounted on bearings 24 and the barrel 18 is connected to the drive shaft housing 25 by conventional means such as bolts 26. The bearing 24 is mounted within the drive shaft housing 25.

Section A of the mixer 19 is the blending portion of the mixer. In the blending section A, the core 26 of the mixer is of relatively small diameter as compared with the diameter of the bore 27 of the barrel 18. This produces rather deep flights 28 for blending the heterogeneous mixture of ingredients. The length of section A is not critical except that it should be of sufficient length so that the heterogeneous mixture is blended to a satisfactory degree. This in turn will depend upon the nature of the products being mixed.

The flights 28 are not continuous flights but are interrupted at various points as noted by the space 29. This space 29 where the flights 28 are interrupted permits a lug 31 extending from the bore 27 to extend into the space between the flights 28. These lugs 31 are utilized to break up the flow of material in the spaces between the flights 28 thus insuring a blending of the material or ingredients which is being agitated by the flights 28. Ingredients which are being agitated and advanced by helical flights often have a tendency to form a plug which follows the space between the flights 28. This plug of material often moves along the length of the core 26 without appreciable blending of the ingredients occurring as a result of the movement. Accordingly, the lugs 31 which extend into the spaces between the flights 28 tend to break up this plug of material and prevent the plug movement through the blending section A of the mixer.

Lugs 31 can also be utilized for another purpose. There may be a need to first blend some of the heterogeneous ingredients for a time prior to introduction of other ingredients. Accordingly, one of the lugs designated by numeral 32 might be made hollow to act as a conduit for introducing an ingredient from reservoir 33 through valve 34 into the blending section A of the mixer. In this manner the new ingredient from reservoir 33 can be uniformly distributed throughout the heterogeneous mixture through the lug 32 at a controlled rate and thus accomplish the desired intermixing of the food ingredient.

The next step of the process after the material has been blended is smear mixing of the blended material to produce a homogeneous mixture thereof. The smear mixing of the material is accomplished by forming a thin film of the blended mixture and subjecting the thin film to continuous and simultaneous pressing, mixing, stretching, and the twisting forces to convert the heterogeneous mixture to a homogeneous mixture. This thin film of material may be formed by spreading the blended mixture between two parallel surfaces and moving the surfaces relative to one another. This produces the smear mixing forces for accomplishing the mixing. Another and preferred means for carrying out this step which is illustrated by box 39 of the flow diagram in FIG. 4 is illustrated in the apparatus of FIG. 1. Section D of the apparatus is the smear mixing section of the mixer 26. This section is essentially a cylinder 41 which is positioned within the bore 27 so that the surface of the cylinder 41 is parallel to the bore 27. The passage 42 between the bore 27 and surface of cylinder 41 forms the thin film of the blended mixture. This thin film is then subjected to the smear mixing forces to accomplish the conversion of the blended mixture to a homogeneous mixture of food ingredients. The passage 42 in this case is a cylindrical passage of uniform thickness. The thin film of the blended mixture is formed in the passage. This film thickness is preferably .035 to .100 inch. The cylinder 41 may be varied in diameter in order to vary the clearance of the passage 42. This clearance and consequent thickness of the film will be governed by a number of factors. Some of these factors include moisture level, temperature and the viscosity of the blended mixture; the concentration and distribution of solid materials in the blended mixture; the nature of the solids in the blended mixture; the type of product desired; and the degree of homogeneity required in the finished product. Degree of homogeneity as referred to here means the extent to which the various food ingredients have been reduced in particle size and the extent they have been distributed in order to produce a satisfactory product. In other words, the homogeneous mixture may be worked sufficiently to break down the granules or particles of the ingredients. On the other hand, the homogeneous mixture may contain particles as large as 0.1 inch. Each particular end product requires a specific degree of homogeneity as dictated by final product quality and texture characteristics. As the diameter of the cylinder 41 is made greater, the peripheral speed of the rotating cylinder 41 will increase consequently increasing the mixing, stretching, and twisting forces applied to the blended mixture as it passes through the passage 42. Further, the length of the cylinder 41 and consequently the length of the passage 42 may be varied by shortening or lengthening the cylinder 41. Again the exact length, diameter and flight geometry will be to a great extent, determined by the degree of homogeneity desired in the end product. The essential feature is that a homogeneous mixture is produced as the blended material or mixture passes through section D of the mixer.

Flights 43 used in the smear mixing section D are utilized to advance the material of the thin film in the passage 42. The pitch of the flights 43 can be varied to vary the speed with which the material passes through the passage 42.

An alternate embodiment of the smear mixing section D is illustrated in FIG. 3 of the drawings where the cylinder is a smooth cylinder 44 having no flights to force the material through the passage 46 formed between the smooth cylinder 44 and the bore 27 of the barrel 18. In this embodiment, the blended material is subjected to exactly the same mixing forces as those described in connection with section D in FIG. 1. However, the material passes through the passage 46 due to pressure developed by flights 47 of the mixer. The practical result of each of the embodiments is the production of a homogeneous mixture of the material.

Each of the cylinders 41 and 44 is rotated by a drive means connected to the shaft 23. This rotation results in forces being applied to the heterogeneous mixture passing through passages 42 and 46. Note that the heterogeneous mixture passes along the length of the barrel 18 and that the forces applied to the thin film of heterogeneous mixture by the cylinders 41 and 44 are at right angles to the direction of the movement of the mixture through the respective passages. Since the barrel 18 is stationary, the movement of the cylinders 41 and 44 results in a relative movement of the respective surfaces; consequently, the heterogeneous mixture is continuously and simultaneously subjected to pressing, mixing, stretching, shearing and twisting forces.

Often it is desirable to gradually increase the pressure on a blended material prior to forcing the blended mixture through the smear mixing section D of the apparatus. This application of pressure occurs after the blending and before the material is forced into the smear mixing section D. This step is illustrated in the FIG. 4 by the dotted block 48 titled metering. This metering insures that the proper pressure is applied to the blended material in order that the blended material will flow uniformly through the passages 42 or 46 and be subjected to the mixing forces.

Sections B and C of the mixer shown in FIG. 1 are a means whereby the blended mixture can be conveyed and pressurized prior to passage through the smear mixing section D. In section B, the core 19 is gradually increased in diameter so that there is a gradual increase in the pressure applied to the blended material. This is noted by the gradual increase in the root diameter of core 19 in section B. Section C is a metering portion of constant root diameter which is utilized immediately preceding the smear mixing section D.

After the smear mixing has been accomplished, to form the homogeneous mixture of food ingredients, the homogeneous mixture may be discharged directly from the smear mixing section D to a subsequent processing station. This is illustrated in FIG. 4 by the discharge arrow 49. It is also illustrated in the alternate embodiment of FIG. 3 where the material is discharged directly from the smear mixing section.

An alternate embodiment of the process and apparatus may include a subsequent metering step where the homogeneous mixture is again pressurized in preparation for extruding the material through a die. The discharged material from the smear mixing section could be directed into a completely separate extruder or preferably a section E may be utilized as in the apparatus illustrated in FIG. 1 to apply pressure to the homogeneous mixture of materials for extrusion from a die 54. The metering step is illustrated by the block 51 in the block diagram. The means for carrying out this metering step is illustrated by the section E of the apparatus in FIG. 1. Section E utilizes an extension of the mixer 19 having a core 52 and flights 53 for applying pressure to the homogeneous mixture of ingredients. The flights 53 may be varied in pitch and flight depth in order to apply the required pressure to the homogeneous mixture of materials. After the material is brought to the proper pressure, it is forced through a die 54 to form an extrudate which can then be utilized to form pellets, flakes, or a rope of material depending upon the ultimate use of the product.

The core 19 shown in FIG. 1 is illustrated with a single helical flight. This is not to be construed as a limitation on the apparatus since some applications may require a double or triple set of flights. Section E particularly may utilize such flights to good advantage since multiple flights minimize surging of the ingredients as they are extruded from the die 54.

Smear mixing of the food ingredients in section D and application of pressure to the homogeneous mixture in section E frequently results in development of high temperatures in these sections. These high temperatures, if not controlled, can result in alteration of the characteristics of the finished product and at worst will result in a completely unsatisfactory product. Preferably, the temperature of most of the listed foods, should be kept below about 80 to about 120° F. Accordingly, a water jacket 56 is placed around the barrel 18 and extends the full length of sections D and E of the barrel. Other means may be used to cool the barrel 18, but the water jacket has been found to be a particularly successful means.

In a preferred embodiment of the apparatus, the water jacket 56 is divided into two compartments, one for each of the sections D and E. The two compartments 57 and 58 provide precise control of the temperature in the sections D and E respectively, of the mixer. This control is frequently necessary because heat is generated in each section at a different rate.

Cool water flows into each of the compartments 57 and 58 through openings 59 and 61 respectively, and is discharged from the respective compartments through outlets 62 and 63 respectively. The flow of cool water through the respective compartments may be controlled by pump and valve systems not shown but which are well known to those skilled in the art.

EXAMPLE 1

The following is an example of a raisin formulation which was prepared using the apparatus and process of the present invention.

The following ingredients were continuously and individually fed into the blender at a rate which produced the indicated percentages of ingredients in the finished product.

|  | Percent |
|---|---|
| Raisins | 54.0 |
| Sugar | 13.0 |
| Dextrose | 13.0 |
| Starch | 12.9 |
| Shortening | 5.0 |
| Flavoring | 2.0 |
| Coloring | 0.1 |
|  | 100.0 |

The raisins were whole raisins having about 10% moisture. The blending took place in a mixer having a 3.25 inch bore of the type apparatus described herein. The blender which was connected to the smear mixer was rotated at about 30 r.p.m. It has been found that a range of about 20 to about 80 r.p.m. is a satisfactory rate of rotation for this type of product, but 30 r.p.m. produces a satisfactory product with a volume at the output of the mixer of about 90 to about 130 lbs. per hour. The temperature of the ingredients in the smear mixer was maintained at about 90° to about 95° F. with the aid of a cool water jacket. The ingredients were smear mixed to produce a homogeneous mixture having pastelike characteristics. The finished product contained a moisture content of about 5 to about 7%.

EXAMPLE 2

Vegetables were processed in substantially the same manner as set forth in Example 1 except that the ingredients involved were simply a 50/50 mixture of carrots and peas. The vegetables were continuously and individually fed into the blender in the form of a paste containing about 35% moisture. After the vegetables were homogenized, the homogeneous mixture was pelletized. In other respects the conditions of Example 1 were followed.

Now therefore we claim:

1. An apparatus for processing food products to form a homogeneous mixture which comprises a barrel having a cylindrical bore interconnecting a feed opening at one end of the barrel and a discharge opening at the opposite end of the barrel; a rotatable mixer having helical flights for at least a portion of the length of the mixer with a core of varying diameters and mounted within said bore; said mixer having feed, blending, pumping, and smear mixing sections; said mixer extending substantially throughout said bore from said feed opening to said discharge opening; said helical flights in said blending section being interrupted to permit backflow of said food products toward said feed opening; said smear mixing section forming a restricted passage to impede the passage of said food products from said pumping section sufficiently to produce a film of said food products on the wall of said barrel to effectuate smear mixing of the product and thereby mix the food product to a homogeneous mixture said smear mixing section further contains continuous helical flights of uniform pitch which have a sufficiently shallow flight depth to permit smear mixing of the food products.

2. An apparatus for processing food products to form a homogeneous mixture which comprises a barrel having a cylindrical bore interconnecting a feed opening at one end of the barrel and a discharge opening at the opposite end of the barrel; a rotatable mixer having helical flights for at least a portion of the length of the mixer with a core of varying diameters and mounted within said bore; said mixer having feed, blending and pumping sections, a plurality of pins extending in a radial direction toward said mixer core and beyond the walls of said barrel in said blending section, a smear mixing section and a section E following said smear mixing section wherein helical flights of said mixer apply pressure to the homogeneous mixture from said smear mixing section; said mixer extending substantially throughout said bore from said feed opening to said discharge opening; the helical flights in said blending section being interrupted to permit backflow of said food products toward said feed opening; said smear mixing section forming a restricted passage to impede the passage of said food products from said pumping section sufficiently to produce a film of said food products on the wall of said barrel to effectuate smear mixing of the product and thereby mix the food product to a homogeneous mixture.

3. An apparatus in accordance with claim 2 which further includes means associated with said smear mixing section and said section E for cooling the homogeneous mixture.

4. An apparatus in accordance with claim 3 which further includes an extrusion die affixed to said barrel at the discharge opening and in which said means for cooling is a water jacket.

References Cited

UNITED STATES PATENTS

| 2,519,014 | 8/1950 | Bankey. |
| 2,838,794 | 6/1958 | Munger et al. |
| 3,023,455 | 3/1962 | Geier et al. _____ 259—9 XR |
| 3,288,443 | 11/1966 | Lynch et al. _____ 259—9 |

WALTER A. SCHEEL, Primary Examiner

A. O. HENDERSON, Assistant Examiner

U.S. Cl. X.R.

259—9